United States Patent
Hashimoto et al.

(10) Patent No.: US 9,669,901 B2
(45) Date of Patent: Jun. 6, 2017

(54) BICYCLE ELECTRIC SHIFTING APPARATUS

(71) Applicant: Shimano Inc., Sakai, Osaka (JP)

(72) Inventors: Akinori Hashimoto, Osaka (JP); Takaya Masuda, Osaka (JP)

(73) Assignee: Shimano Inc., Osaka (JP)

( * ) Notice: Subject to any disclaimer, the term of this patent is extended or adjusted under 35 U.S.C. 154(b) by 223 days.

(21) Appl. No.: 14/639,817

(22) Filed: Mar. 5, 2015

(65) Prior Publication Data

US 2016/0257377 A1    Sep. 8, 2016

(51) Int. Cl.
*B62M 25/08* (2006.01)
*B62M 9/04* (2006.01)

(52) U.S. Cl.
CPC .............. *B62M 25/08* (2013.01); *B62M 9/04* (2013.01)

(58) Field of Classification Search
CPC .................................. B62M 25/08; B62M 9/04
See application file for complete search history.

(56) References Cited

U.S. PATENT DOCUMENTS

| | | | |
|---|---|---|---|
| 6,015,036 A | 1/2000 | Fukuda | |
| 6,877,755 B2 | 4/2005 | Takamoto | |
| 6,884,190 B2 | 4/2005 | Takebayashi | |
| 7,290,779 B2 | 11/2007 | Takamoto et al. | |
| 7,399,244 B2 | 7/2008 | Takebayashi et al. | |
| 7,900,946 B2 | 3/2011 | Hara et al. | |
| 8,235,408 B2 | 8/2012 | Watarai | |
| 8,655,561 B2 | 2/2014 | Kitamura | |
| 8,882,122 B2 | 11/2014 | Emura et al. | |
| 9,399,500 B1* | 7/2016 | Hashimoto | B62M 9/122 |
| 2007/0137361 A1* | 6/2007 | Fujii | B62K 23/06 74/473.13 |
| 2008/0121066 A1* | 5/2008 | Takebayashi | B62K 23/06 74/502.2 |
| 2014/0053675 A1* | 2/2014 | Tetsuka | B62M 25/08 74/473.13 |
| 2014/0303859 A1* | 10/2014 | Miki | B62M 25/08 701/60 |
| 2014/0345411 A1* | 11/2014 | Miki | F16H 59/044 74/473.12 |
| 2015/0203169 A1* | 7/2015 | Nishino | B62K 23/06 74/491 |
| 2017/0001688 A1* | 1/2017 | Jordan | B62K 23/02 |

* cited by examiner

*Primary Examiner* — Jacob S Scott
(74) *Attorney, Agent, or Firm* — Global IP Counselors, LLP

(57) ABSTRACT

A bicycle electrical shifting apparatus is basically provided with a shift operating device that includes an operating member and a first controller. The first controller is programmed to output a first signal that starts a shifting operation in response to a single manual operation of the operating member and a second signal that ends the shifting operation in response to an end of the single manual operation of the operating member.

15 Claims, 10 Drawing Sheets

BICYCLE ELECTRIC SHIFTING APPARATUS

BACKGROUND

Field of the Invention

This invention generally relates to a bicycle electric shifting apparatus. More specifically, the present invention relates to a bicycle electric shifting apparatus in which signals for performing a shifting operation is outputted.

Background Information

In recent years, some bicycles are provided with electric bicycle components to make it easier for the rider to operate the bicycle. For example, electric transmission devices (e.g., derailleurs, internally geared hubs, etc.) are now available for electrically shifting speeds of the drive train. Typically, the electric transmission devices are provided with an electric actuator or motor for changing gear ratios of the drive train. In an electric shifting apparatus, the bicycle is also equipped with a shift operating device that is manually operated for controlling one or more of the electric transmission devices of the electric shifting apparatus. These shift operating devices and the electric transmission devices can receive power from a main electrical power supply and/or they can be equipped with their own electrical power supply.

SUMMARY

In accordance with a first aspect of the present disclosure, a bicycle electrical shifting apparatus is provided that basically comprises a shift operating device that includes an operating member and a first controller. The first controller is programmed to output a first signal that starts a shifting operation in response to a single manual operation of the operating member and a second signal that ends the shifting operation in response to an end of the single manual operation of the operating member.

In accordance with a second aspect of the present invention, the bicycle electrical shifting apparatus according to the first aspect is configured so that the first signal is independent from the second signal.

In accordance with a third aspect of the present invention, the bicycle electrical shifting apparatus according to the first aspect is configured so that the first signal is different from the second signal.

In accordance with a fourth aspect of the present invention, the bicycle electrical shifting apparatus according to the third aspect is configured so that the first signal is different from the second signal in a wave shape.

In accordance with a fifth aspect of the present invention, the bicycle electrical shifting apparatus according to the third aspect is configured so that the first signal is different from the second signal in a voltage.

In accordance with a sixth aspect of the present invention, the bicycle electrical shifting apparatus according to the first aspect further comprises a first wireless communication unit configured to wirelessly transmit a first control signal corresponding to the first signal outputted from the first controller, and to wirelessly transmit a second control signal corresponding to the second signal outputted from the first controller.

In accordance with a seventh aspect of the present invention, the bicycle electrical shifting apparatus according to the first aspect further comprises a transmission and a second controller. The second controller is programmed to receive a first control signal corresponding to the first signal outputted from the first controller and a second control signal corresponding to the second signal outputted from the first controller. The second controller is programmed to control the transmission to start the shifting operation in response to receiving the first control signal to stop the shifting operation in response to receiving the second control signal.

In accordance with an eighth aspect of the present invention, the bicycle electrical shifting apparatus according to the seventh aspect is configured so that the second controller is configured to stop the shifting operation upon determining the transmission reaches one of a highest speed stage and a lowest speed stage.

In accordance with a ninth aspect of the present invention, the bicycle electrical shifting apparatus according to the seventh aspect further comprises a first wireless communication unit configured to wirelessly transmit first and second control signals, and a second wireless communication unit configured to wirelessly receive the first and second control signals outputted from the first wireless communication unit.

In accordance with a tenth aspect of the present invention, the bicycle electrical shifting apparatus according to the seventh aspect is configured so that the second controller is further programmed to control the transmission to shift one speed stage of the transmission upon determining a first predetermined time period has occurred after receiving the first control signal corresponding to the first signal. The second controller is further programmed to control the transmission to further shift one speed stage of the transmission upon determining a second predetermined time period has occurred after the first predetermined time period has occurred.

In accordance with an eleventh aspect of the present invention, the bicycle electrical shifting apparatus according to the tenth aspect is configured so that the first predetermined time period is the same as the second predetermined time period.

In accordance with a twelfth aspect of the present invention, the bicycle electrical shifting apparatus according to the tenth aspect is configured so that the first predetermined time period is different from the second predetermined time period.

In accordance with a thirteenth aspect of the present invention, the bicycle electrical shifting apparatus according to the tenth aspect is configured so that the second controller is further programmed to vary the at least one of the first and second predetermined time periods in response to an input.

In accordance with a fourteenth aspect of the present invention, the bicycle electrical shifting apparatus according to the seventh aspect is configured so that the first controller is further programmed to output at least one additional signal between the first signal and the second signal and the additional signal is configured to have the second controller continue the shifting operation.

In accordance with a fifteenth aspect of the present invention, the bicycle electrical shifting apparatus according to the fourteenth aspect is configured so that the first controller further programmed to output the at least one additional signal every time a third predetermined time period is occurred.

Also other objects, features, aspects and advantages of the disclosed bicycle electrical shifting apparatus will become apparent to those skilled in the art from the following detailed description, which, taken in conjunction with the annexed drawings, discloses one embodiment of the bicycle electrical shifting apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
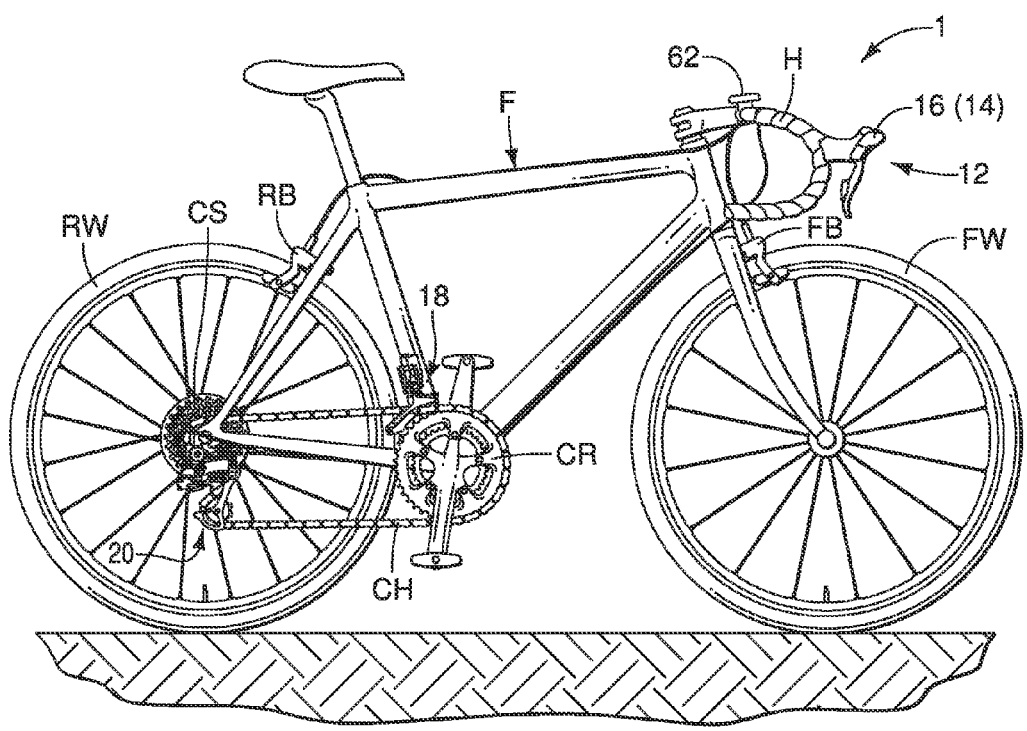
FIG. 1 is a side elevational view of a bicycle that includes a bicycle electrical shifting apparatus in accordance with one disclosed embodiment.

Referring initially to FIG. 1, a bicycle 1 is illustrated that is equipped with a bicycle electrical shifting apparatus 12 in accordance with one illustrated embodiment. The bicycle electrical shifting apparatus 12 is an electrically powered system. In the illustrated embodiment, the bicycle electrical shifting apparatus 12 basically comprises a first (front) shift operating device 14 and a second (rear) shift operating device 16. The bicycle electrical shifting apparatus 12 further comprises a first (front) bicycle electric transmission device 18 and a second (rear) electric transmission device 20 that forms a transmission or drive train of the bicycle 1. However, the bicycle electrical shifting apparatus 12 is not limited to this particular arrangement, and does not necessarily need all of the devices. For example, the bicycle electrical shifting apparatus 12 can be considered to be only one of the first and second shift operating devices 14 and 16.

Also the transmission of the bicycle electrical shifting apparatus 12 could be only a single shift operating device and a transmission device.

Basically, as explained below, the first shift operating device 14 and the first bicycle electric transmission device 18 are configured to wirelessly communicate, while the second shift operating device 16 and the second bicycle electric transmission device 20 are configured to wirelessly communicate. However, the first shift operating device 14 and the first bicycle electric transmission device 18 can be connected by a first electrical wire to communicate via power line communication (PLC), and the second shift operating device 16 and the second electric transmission device 20 can be connected by a second electrical wire to communicate via power line communication (PLC).

In the illustrated embodiment, the first and second shift operating devices 14 and 16 are shifters that include a braking function. In the illustrated embodiment, the first and second bicycle electric transmission devices 18 and 20 are bicycle derailleurs. Specifically, the first bicycle electric transmission device 18 is a front bicycle derailleur, while the second bicycle electric transmission device 20 is a rear bicycle derailleur.

Referring to FIG. 1, the bicycle 1 includes, among other things, a bicycle frame F with a handlebar H, a front wheel FW, a rear wheel RW, a front brake FB and a rear brake RB. Referring again to FIG. 1, the front wheel FW is mounted in a conventional manner to a steering fork of the bicycle frame F below the handlebar H. The rear wheel RW includes a cassette of chain sprockets CS. The rear wheel RW is mounted in a conventional manner to a rear portion of the bicycle frame F. A chainring assembly CR, as shown in FIG. 1, is rotatably supported to a lower portion of the bicycle frame F in a conventional manner. The chainring assembly CR includes a set of chainrings mounted to the crank axle in a conventional manner. A chain C is operatively coupled between the rear sprockets and the chainrings in a conventional manner. Since the front wheel FW, the rear wheel RW, the front brake PB, the rear brake RB, the cassette CS and the chainring assembly CR are all conventional elements, no further description is provided for the sake of brevity. Also, while the bicycle 1 is illustrated as a road bicycle, the bicycle electrical shifting apparatus 12 can be used with other types of bicycles.

Figure 2:
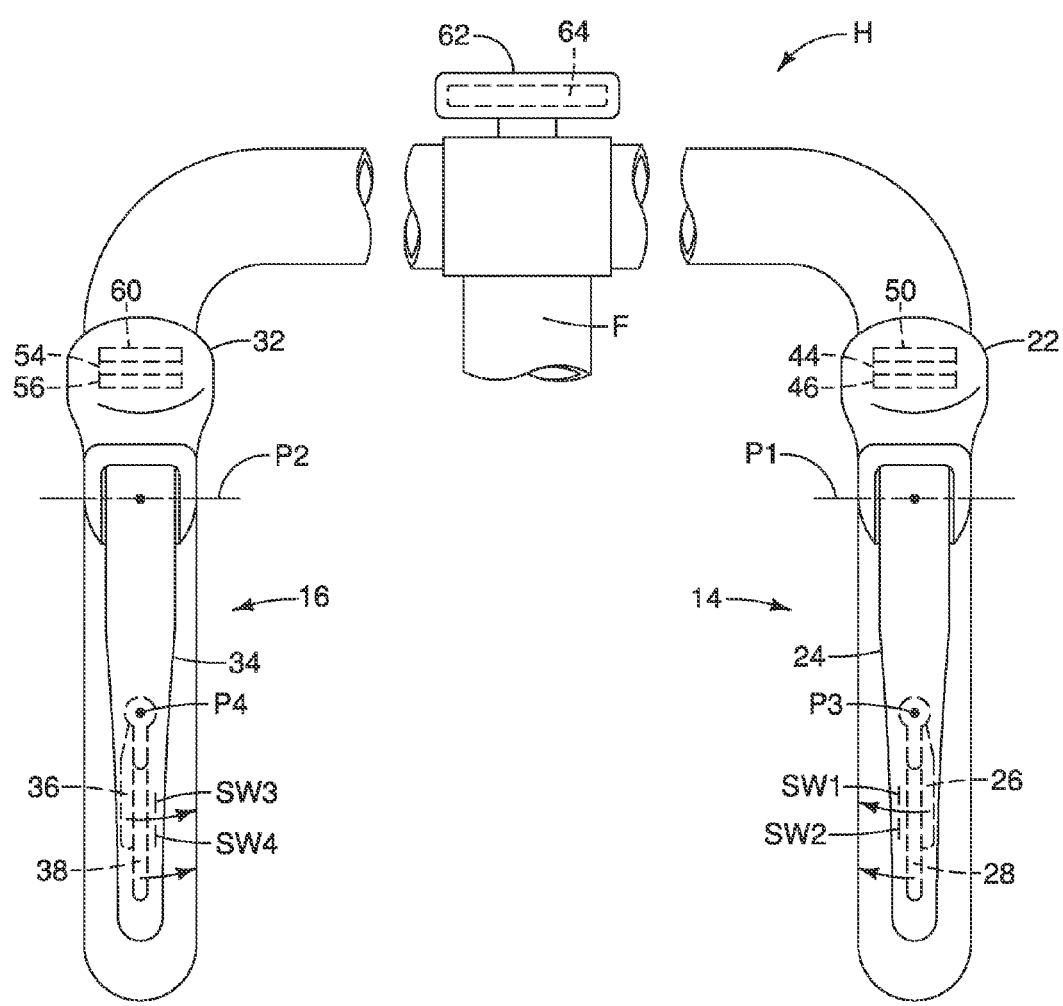
FIG. 2 is a front elevational view of a bicycle handlebar area of the bicycle illustrated in FIG. 1.
Figure 3:
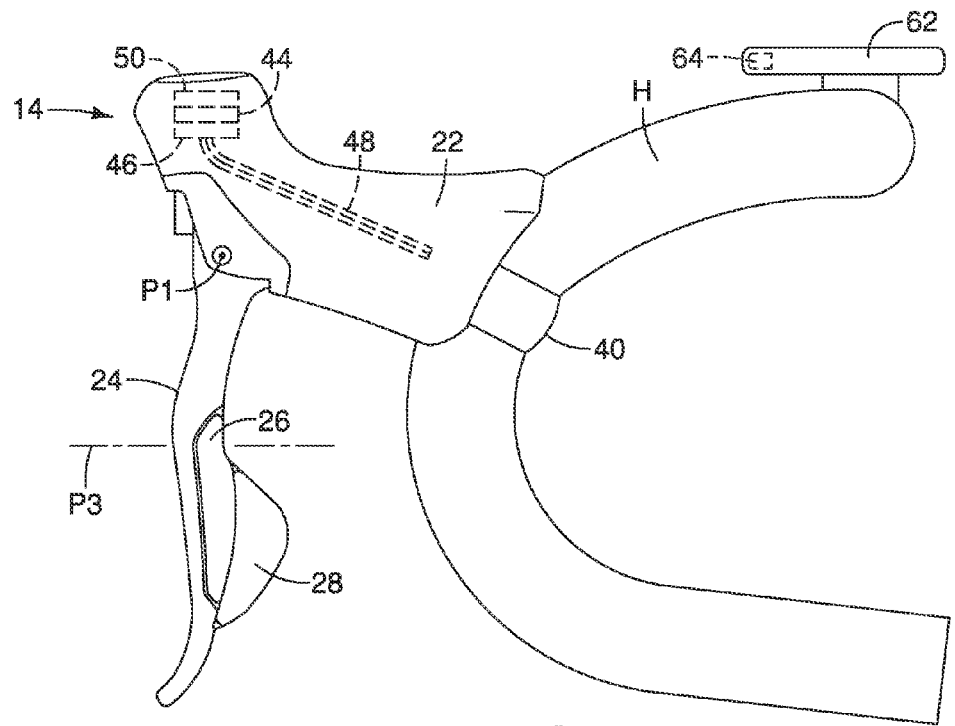
FIG. 3 is a side elevational view of the handlebar and the left or first shift operating device (front shifter) showing a left outboard side of the bicycle illustrated in FIG. 1.
Figure 4:
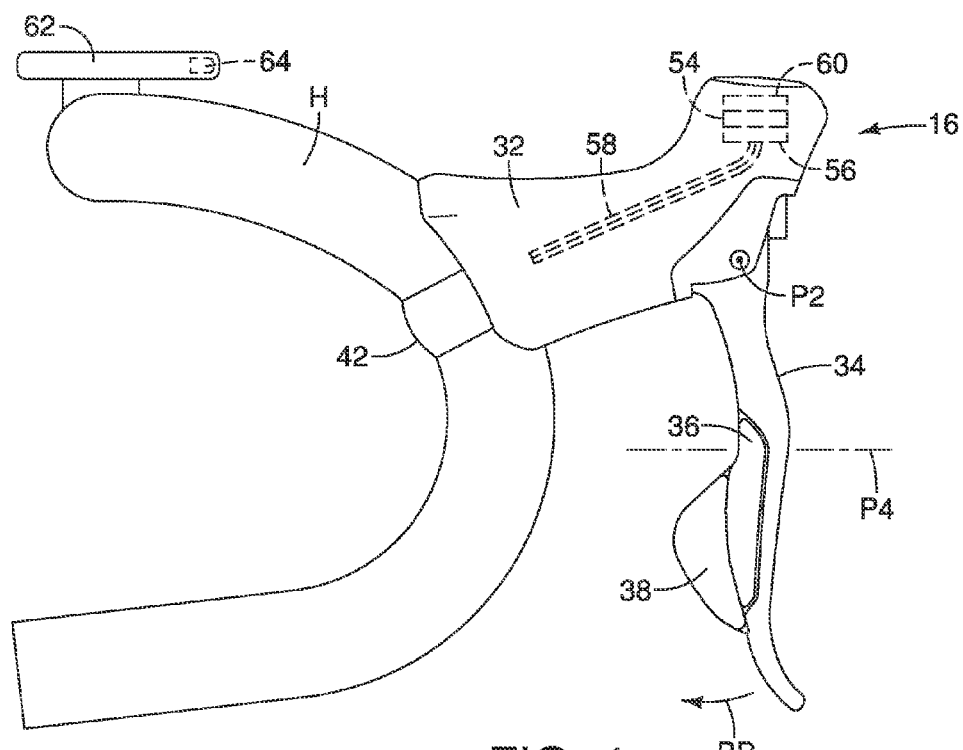
FIG. 4 is a side elevational view of the handlebar and the right or second shift operating device (rear shifter) showing a right outboard side of the bicycle illustrated in FIG. 1.

Referring now to FIGS. 2 to 4, the first and second shift operating devices 14 and 16 will now be discussed. In the illustrated embodiment, the first shift operating device 14 (i.e., left hand shift/brake operating device) controls the first bicycle electric transmission device 18 and the front brake FB. Basically, the first shift operating device 14 includes a bracket 22, a brake operating member 24, a first shift operating member 26 and a second shift operating member 28. The second shift operating device 16 (i.e., right hand shift/brake operating device) controls the second bicycle electric transmission device 20 and the rear brake RB. Basically, the second shift operating device 16 includes a bracket 32, a brake operating member 34, a first shift operating member 36 and a second shift operating member 38. It will be apparent to those skilled in the bicycle field from this disclosure that the first and second shift operating devices 14 and 16 are not limited to this configuration.

The brackets 22 and 32 are preferably made of a lightweight material such as composite materials, plastic, polymers or light weight metals such as aluminum or titanium. The first shift operating device 14 includes a bicycle frame attachment member 40 that attaches the bracket 22 to a left portion of the handlebar ti in a conventional manner. The second shift operating device 16 includes a bicycle frame attachment member 42 that attaches the bracket 32 to a right portion of the handlebar ti in a conventional manner. Here, the brake operating member 24 is a brake lever that is pivotally mounted to the bracket 22 about a pivot axis P1, while the brake operating member 34 is a brake lever that is pivotally mounted to the bracket 32 about a pivot axis P2. Of course, the first and second shift operating devices 14 and 16 are not limited to being mounted on the handlebar H. The first and second shift operating devices 14 and 16 can be positioned anywhere within reach of the user.

As see in FIG. 2, the first and second shift operating members 26 and 28 are pivotally mounted to the brake operating member 24 about a pivot axis P3. The first shift operating member 26 operates a switch SW1 as the first shift operating member 26 pivots about the pivot axis P3 from a rest position (FIG. 2) to an operated position. The second shift operating member 28 operates a switch SW2 as the first shift operating member 26 pivots about the pivot axis P3 from a rest position (FIG. 2) to an operated position. The first and second shill operating members 26 and 28 are trigger levers that are biased to their rest positions such that they each automatically return to their rest positions upon being released from an operated position. The term "rest position" as used herein refers to a state in which a movable part (e.g., the first and second shift operating members 26 and 28) remains stationary without the need of a user intervening (e.g., holding the movable part) to establish a state corresponding to the rest position. Thus, the term "rest position" can also be referred to as a non-operated position. The switches SW1 and SW2 can be any type of switches. For example, the switches SW1 and SW2 can include any type of toggle switch, pressure switch, contactless switch or any other suitable type of switch that provides an output signal in response to shifting movement of the first and second shift operating members 26 and 28 about the pivot axis P3 to effect upshifting and downshifting.

The first and second shift operating members 36 and 38 are pivotally mounted to the brake operating member 34 about a pivot axis P4. The first shift operating member 36 operates a switch SW3 as the first shift operating member 36 pivots about the pivot axis P4 from a rest position (FIG. 2) to an operated position. The second shift operating member 38 operates a switch SW4 as the first shift operating member 26 pivots about the pivot axis P4 from a rest position (FIG. 2) to an operated position. The first and second shift operating members 36 and 38 are trigger levers that are biased to their rest positions such that they each automatically return to their rest positions upon being released from an operated position. The switches SW3 and SW4 can be any type of switches. For example, the switches SW3 and SW4 can include any type of toggle switch, pressure switch, contactless switch or any other suitable type of switch that provides an output signal in response to shifting movement of the first and second shift operating members 36 and 38 about the pivot axis P4 to effect upshifting and downshifting.

In the illustrated embodiment, the first shift operating device 14 further includes a first controller 44 and a first wireless communication unit 46 (wireless transmitter). Basically, the first controller 44 operates the first wireless communication unit 46 to output signals for shifting the first bicycle electric transmission device 18 based on the operation of the first and second shift operating members 26 and 28. Of course, the first controller 44 can be programmed with other functions as needed and/or desired.

The first controller 44 is programmed to output a first signal that starts a shifting operation in response to a single manual operation of the first shift operating member 26 and a second signal that ends the shifting operation in response to an end of the single manual operation of the first shift the operating member 26. Thus, the first signal is independent from the second signal. The first signal is different from the second signal. In this way, the first wireless communication unit 46 can distinguish between the first and second signals that are received from the first controller 44. For example, the first signal is different from the second signal. Alternatively, for example, the first signal is different from the second signal in a voltage.

In the illustrated embodiment, the first and second signals that are produced by the first controller 44 in response to the operation of the first shift operating member 26 results in an upshifting operation of the first bicycle electric transmission device 18, unless the first bicycle electric transmission device 18 is already at the highest speed stage when the first shift operating member 26 is operated. Similarly, the first controller 44 is programmed to output a first signal that starts a shifting operation in response to a single manual operation of the second shift operating member 28 and a second signal that ends the shifting operation in response to an end of the single manual operation of the second shift the operating member 28. Thus, again, the first signal is independent from the second signal. The first signal is different from the second signal. In this way, the first wireless communication unit 46 can distinguish between the first and second signals that are received from the first controller 44. For example, the first signal is different from the second signal. Alternatively, for example, the first signal is different from the second signal in a voltage.

In the illustrated embodiment, the first and second signals that are produced by the first controller 44 in response to the operation of the second shift operating member 28 results in a downshifting operation of the first bicycle electric transmission device 18, unless the first bicycle electric transmission device 18 is already at the lowest speed stage when the second shift operating member 28 is operated.

When the first bicycle electric transmission device 18 has three speed stages, the rider can upshift one or two speed stages from the lowest speed stage depending on the length of time that the first shift operating member 26 is held in the operated position. Similarly, the first bicycle electric transmission device 18 has three speed stages, the rider can downshift one or two speed stages from the highest speed stage depending on the length of time that the second shift operating member 28 is held in the operated position.

The first controller 44 is electrically connected to the switches SW1 and SW2 by electrical wires (not shown). The first controller 44 is also electrically connected to the first wireless communication unit 46. For example, the first controller 44 and the first wireless communication unit 46 can be provided on a printed circuit board that is mounted to the bracket 22. In the illustrated embodiment, the first shift operating device 14 further includes an antenna 48 that is electrically connected to the first wireless communication unit 46 for transmitting signals indicative of the operation of the switches SW1 and SW2 by the first and second shift operating members 26 and 28. In the illustrated embodiment, the first shift operating device 14 further includes an on-board power source 50 that can be provided on the printed circuit board for the first controller 44 and the first wireless communication unit 46.

Depending on the functions of the first controller 44, the first wireless communication unit 46 can be a one-way communication unit or a two-way wireless communication unit as needed and/or desired. The terms "wireless transmitter" and "wireless communication unit" as used herein includes a transceiver, transmitter-receiver, or radio, and contemplates any device or devices, separate or combined, capable of transmitting wireless signals, including shift signals or control, command or other signals related to some function of the component being controlled.

Similarly, in the illustrated embodiment, the second shift operating device 16 further includes a first controller 54 and a first wireless communication unit 56 (wireless transmitter). Basically, the first controller 54 operates the first wireless communication unit 56 to output signals for shifting the second bicycle electric transmission device 20 based on the operation of the first and second shift operating members 36 and 38. Of course, the first controller 54 can be programmed with other functions as needed and/or desired. Depending on the functions of the first controller 54, the first wireless communication unit 56 can be a two-way wireless communication unit if needed and/or desired.

The first controller 54 is programmed to output a first signal that starts a shifting operation in response to a single manual operation of the first shift operating member 36 and a second signal that ends the shifting operation in response to an end of the single manual operation of the first shift the operating member 36. Thus, the first signal is independent from the second signal. The first signal is different from the second signal. In this way, the first wireless communication unit 56 can distinguish between the first and second signals that are received from the first controller 54. For example, the first signal is different from the second signal. Alternatively, for example, the first signal is different from the second signal in a voltage.

In the illustrated embodiment, the first and second signals that are produced by the first controller 54 in response to the operation of the first shift operating member 36 results in an upshifting operation of the second bicycle electric transmission device 20, unless the second bicycle electric transmission device 20 is already at the highest speed stage when the first shift operating member 36 is operated. Similarly, the first controller 54 is programmed to output a first signal that starts a shifting operation in response to a single manual operation of the second shift operating member 38 and a second signal that ends the shifting operation in response to an end of the single manual operation of the second shift the operating member 38. Thus, again, the first signal is independent from the second signal. The first signal is different from the second signal. In this way, the first wireless communication unit 56 can distinguish between the first and second signals that are received from the first controller 54. For example, the first signal is different from the second signal. Alternatively, for example, the first signal is different from the second signal in a voltage.

In the illustrated embodiment, the first and second signals that are produced by the first controller 54 in response to the operation of the second shift operating member 38 results in a downshifting operation of the second bicycle electric transmission device 20, unless the second bicycle electric transmission device 20 is already at the lowest speed stage when the second shift operating member 38 is operated.

Typically, the second bicycle electric transmission device 20 has multiple speed stages. The rider can upshift one or more speed stages depending on the length of time that the first shift operating member 36 is held in the operated position. Similarly, the rider can downshift one or more speed stages depending on the length of time that the second shift operating member 38 is held in the operated position.

The first controller 54 is electrically connected to the switches SW3 and SW4 by electrical wires (not shown). The first controller 54 is also electrically connected to the first wireless communication unit 56. For example, the first controller 54 and the first wireless communication unit 56 can be provided on a printed circuit board that is mounted to the bracket 32. In the illustrated embodiment, the first shift operating device 16 further includes an antenna 58 that is electrically connected to the first wireless communication unit 56 for transmitting signals indicative of the operation of the switches SW3 and SW4 by the first and second shill operating members 36 and 38. In the illustrated embodiment, the second shift operating device 16 further includes an on-board power source 60 that can be provided on the printed circuit board for the first controller 54 and the first wireless communication unit 56.

Each of the first controllers 44 and 54 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The first controller 44 is programmed to process signals from the switches SW1 and SW2 as upshifting signals and downshifting signals, respectively, for shifting the first bicycle electric transmission device 18. The first controller 54 is programmed to process signals from the switches SW3 and SW4 as upshifting signals and downshifting signals, respectively, for shifting the second bicycle electric transmission device 20.

Each of the on-board power sources 50 and 60 can include a generator that is configured to generate an electric power. For example, the on-board power sources 50 and 60 can include a piezoelectric element that is configured to generate the electric power by a pressure due to the operation of one of the switches SW1 to SW4.

Figure 8:
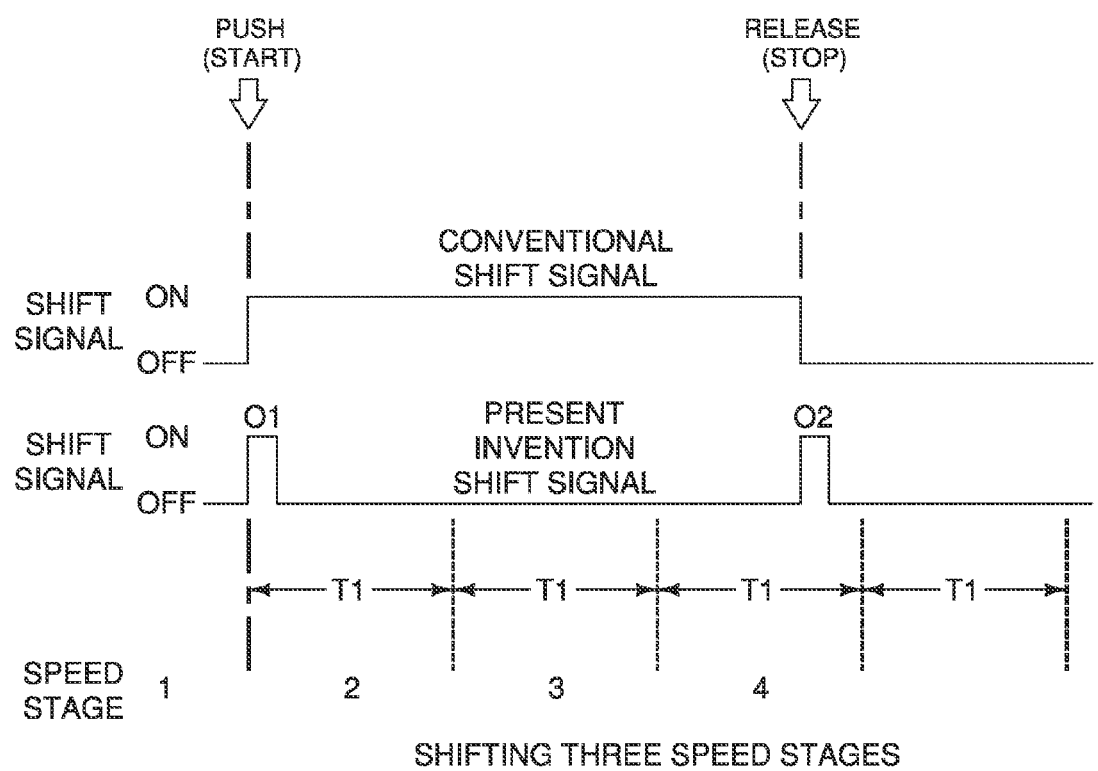
FIG. 8 is a shift timing diagram illustrating a comparison between a conventional shift signal outputted to shift the transmission of a conventional bicycle electrical shifting apparatus and a shift signal outputted to shift the transmission of the bicycle electrical shifting apparatus of FIG. 7.

Referring to FIG. 8, a first signal timing is illustrated that depicts a first wireless control signal O1 and a second wireless control signal O2 that are outputted by the first wireless communication units 46 and 56 and received by the second wireless communication units 74 and 84. The second controllers 76 and 86 then control the actuators 78 and 88 of the first and second bicycle electric transmission devices 18 and 20, respectively, to perform a shifting operation. The first signal timing is used in both upshifting operations and downshifting operations for both the first and second bicycle electric transmission devices 18 and 20.

The wireless control signals O1 and O2 (corresponding to the first and second signals of the first controllers 44 and 54) can be radio frequency (RE) signals or any other type of signal suitable for wireless communications as understood in the bicycle field. It should also be understood that the first and second wireless communication units 46 and 56 can transmit the signals at a particular frequency and/or with an identifier such as a particular code, to distinguish the wireless control signal from other wireless control signals. In this way, the first bicycle electric transmission device 18 can recognize which wireless control signals are upshifting signals for the first bicycle electric transmission device 18 and which control signals are downshifting signals for the first bicycle electric transmission device 18. Likewise, the second bicycle electric transmission device 20 can recognize which control signals are upshifting signals for the second bicycle electric transmission device 20 and which control signals are downshifting signals for the second bicycle electric transmission device 20. Thus, the first bicycle electric transmission device 18 ignores the control signals for the second bicycle electric transmission device 20, and the second bicycle electric transmission device 20 ignores the control signals for the first bicycle electric transmission device 18.

For the first shift operating device 14, the first wireless control signal O1 corresponds to the first signal of the first controller 44. Thus, the first wireless control signal O1 is outputted at the time that the first shift operating member 26 and/or the second shift operating member 28 is operated. On the other hand, tier the first shift operating device 14, the second wireless control signal O2 corresponds to the second signal of the first controller 44. Thus, the second wireless control signal O2 is outputted at the time that the first shift operating member 26 and/or the second shift operating member 28 is release back to the rest position.

Similarly, for the second shift operating device 16, the first wireless control signal O1 corresponds to the first signal of the first controller 54. Thus, the first wireless control signal O1 is outputted at the time that the first shift operating member 36 and/or the second shift operating member 38 is operated. On the other hand, for the second shill operating device 16, the second wireless control signal O2 corresponds to the second signal of the first controller 54. Thus, the second wireless control signal O2 is outputted at the time that the first shift operating member 36 and/or the second shift operating member 38 is release back to the rest position.

Now, an upshifting operation will be discussed. Upshifting of the first bicycle electric transmission device 18 is accomplished by operating the first shift operating member 26, while upshifting of the second bicycle electric transmission device 20 is accomplished by operating the first shift operating member 36. During an upshifting operation the first shift operating member 26 or 36 is operated (pushed) which causes the switch SW1 or SW3 to send an operation signal to the first controller 44 or 54, respectively. Then, the first controller 44 or 54 outputs the first signal to the first wireless communication unit 46 or 56, which in turn then produces the first wireless control signal O1 for a short period of time such as 560 microseconds. The first signal and the first wireless control signal O1 are indicative of the operation of the SW1 or SW3 by the first shift operating member 26 or 36. Then the first wireless communication unit 46 or 56 will stop transmitting until the first shift operating member 26 or 36 is released. When the first shift operating member 26 or 36 is released, the switch SW1 or SW3 will send a release signal to the first controller 44 or 54, respectively. Then, the first controller 44 or 54 outputs the second signal to the first wireless communication unit 46 or 56. In other words, the first wireless communication unit 46 or 56 reads or otherwise receives the first and second signals outputted from the first controller 44. Then the first wireless communication unit 46 or 56 produces the second wireless control signal O2 for a short period of time such as 560 microseconds. The second signal and the second wireless control signal O2 are indicative of the operation of the SW1 or SW3 being released by the first shift operating member 26 or 36. In this way, each of the first wireless communication units 46 and 56 are configured to wirelessly transmit the first and second wireless control signals O1 and O2 that correspond to the first and second signals outputted from the first controller 44.

Now, a downshifting operation will be discussed. Downshifting of the first bicycle electric transmission device 18 is accomplished by operating the second shift operating member 28, while upshifting of the second bicycle electric transmission device 20 is accomplished by operating the second shift operating member 38. During a downshifting operation the second shift operating member 28 or 38 is operated (pushed) which causes the switch SW2 or SW4 to send an operation signal to the first controller 44 or 54, respectively. Then, the first controller 44 or 54 outputs the first signal to the first wireless communication unit 46 or 56, which in turn then produces the first wireless control signal O1 for a short period of time such as 560 microseconds. The first signal and the first wireless control signal O1 are indicative of the operation of the SW2 or SW4 by the second shift operating member 28 or 38. Then the first wireless communication unit 46 or 56 wilt stop transmitting until the second shift operating member 28 or 38 is released. When the second shift operating member 28 or 38 is released, the switch SW2 or SW4 will send a release signal to the first controller 44 or 54, respectively. Then, the first controller 44 or 54 outputs the second signal to the first wireless communication unit 46 or 56. In other words, the first wireless communication unit 46 or 56 reads or otherwise receives the first and second signals outputted from the first controller 44. Then the first wireless communication unit 46 or 56 produces the second wireless control signal O2 for a short period of time such as 560 microseconds. The second signal and the second wireless control signal O2 are indicative of the operation of the SW2 or SW4 being released by the second shift operating member 28 or 38. In this way, each of the first wireless communication units 46 and 56 are configured to wirelessly transmit the first and second wireless control signals O1 and O2 that correspond to the first and second signals outputted from the first controller 44.

Whether upshifting or downshifting, the second wireless communication unit 74 or 84 will receive the first and second wireless control signals O1 and O2. Then, based on the first and second wireless control signals O1 and O2, the second controller 76 or 86 controls the actuators 78 or 88 of the first and second bicycle electric transmission devices 18 or 20, respectively, to perform either an upshifting operation or a downshifting operation. With the first signal timing, the second controller 76 controls the actuator 78. Likewise, with the first signal timing, the second controller 86 controls the actuator 88.

As seen in FIGS. 2 to 4, in the illustrated embodiment, the bicycle electrical shifting apparatus 12 further includes a cycle computer or control unit 62 that is mounted to a central portion of the handlebar H in a conventional manner. The control unit 62 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. In the illustrated embodiment, the control unit 62 includes a wireless receiver 64, which can receive information from the first and second wireless communication units 46 and 56 of the first and second shift operating devices 14 and 16, respectively. Alternatively, the control unit 62 can be electrically coupled to the first and second shift operating devices 14 and 16 via wires or other suitable connections.

Figure 5:
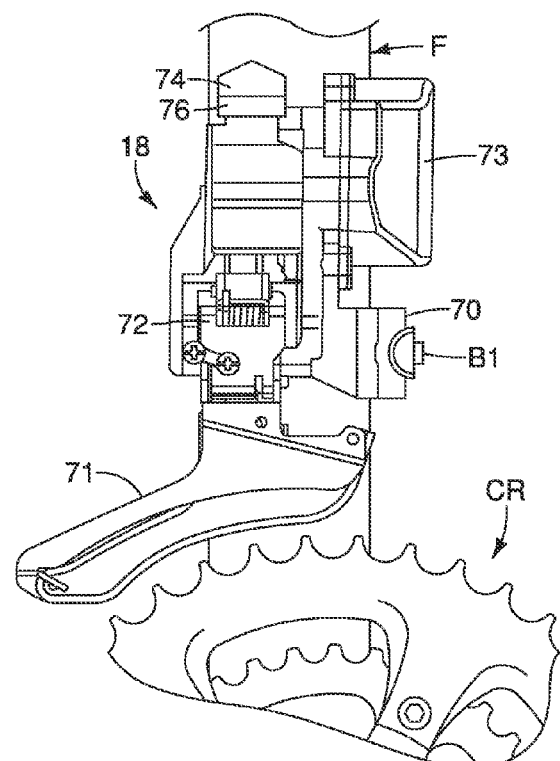
FIG. 5 is a side elevational view of the front bicycle derailleur as one of the bicycle electric transmission devices of the bicycle illustrated in FIG. 1.
Figure 6:
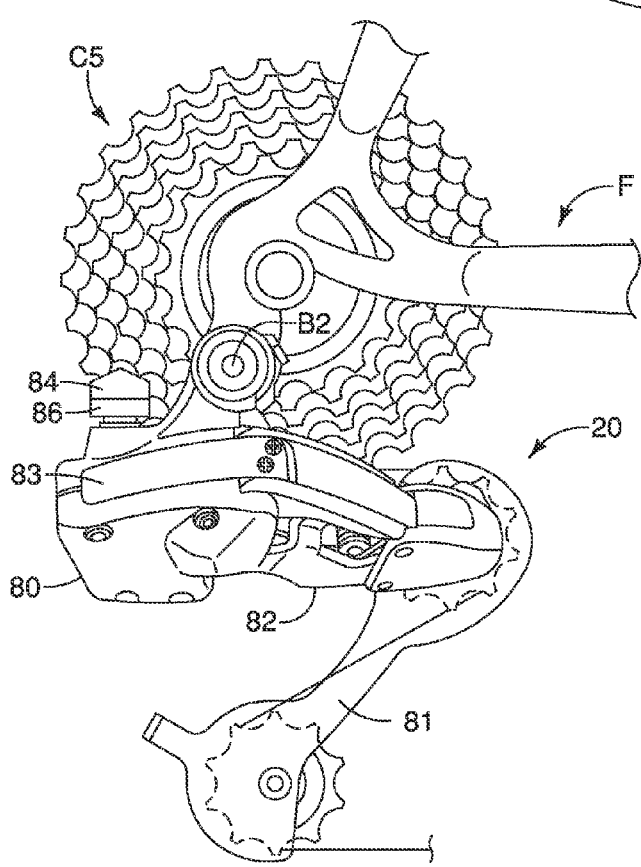
FIG. 6 is a side elevational view of the rear bicycle derailleur as one of the bicycle electric transmission devices of the bicycle illustrated in FIG. 1.
Figure 7:
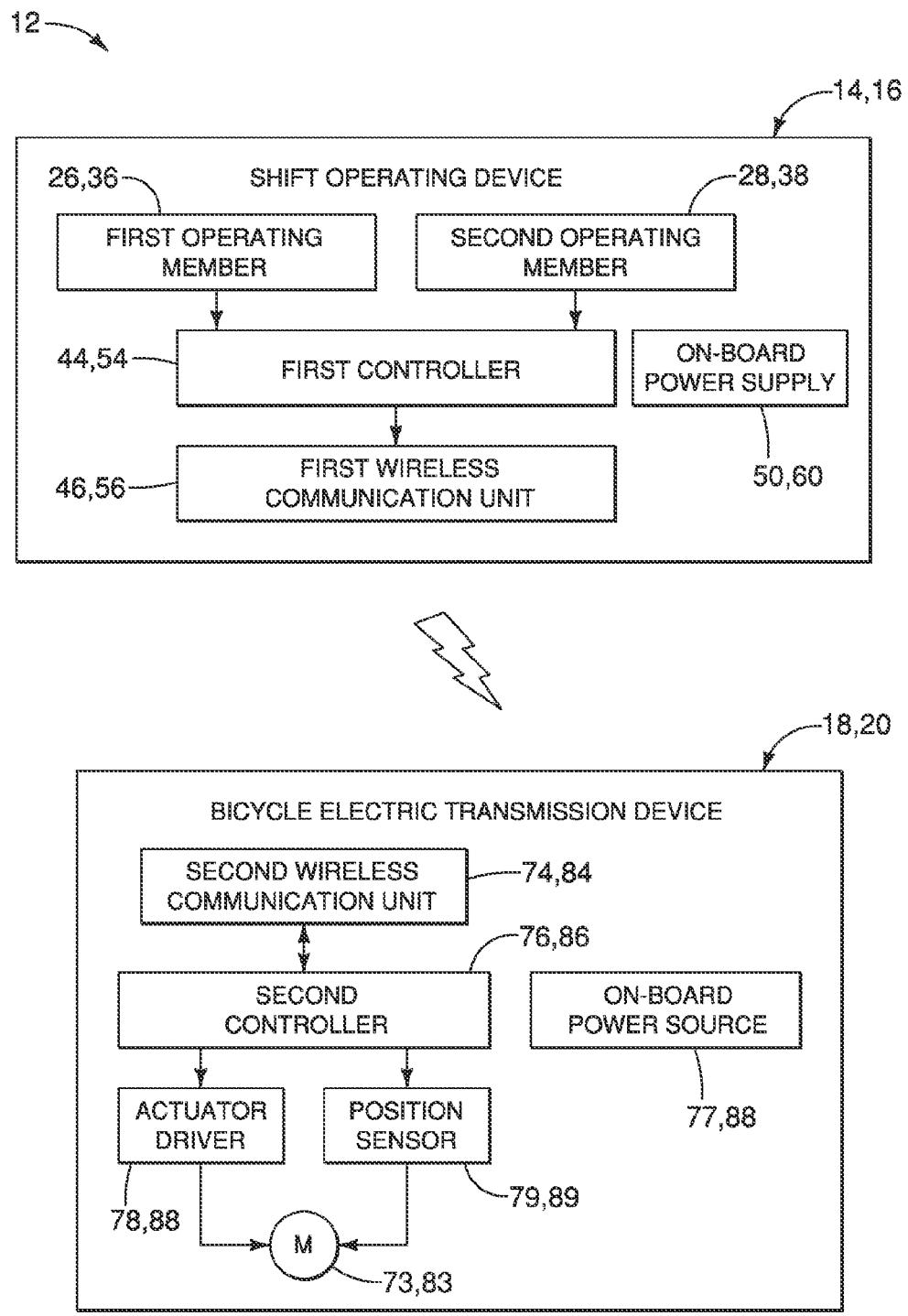
FIG. 7 is a simplified schematic block diagram of an example of the bicycle electrical shifting apparatus having one of the shift operating devices and one of the bicycle electric transmission devices (e.g., one of the rear and front derailleurs) of the bicycle shown in FIG. 1.

Referring now to FIGS. 5 and 6, the first and second bicycle electric transmission devices 18 and 20 will now be discussed. As mentioned above, the first and second bicycle electric transmission devices 18 and 20 are bicycle derailleurs. However, it will be apparent to those skilled in the bicycle field from this disclosure that the bicycle electric transmission devices are not limited to bicycle derailleurs. For example, the rear bicycle electric transmission device can be an internally geared hub.

As seen in FIG. 5, the first bicycle electric transmission device 18 is a front bicycle derailleur that has a base member 70, a chain guide 71 and a linkage 72. The base member 70 is configured to be attached to the bicycle 1. In particular, the base member 70 is attached to the bicycle frame F adjacent to the chainring assembly CR by a bolt B1. The chain guide 71 is movably supported relative to the base member 70. Specifically, in the illustrated embodiment, the linkage 72 movably supports the chain guide 71 relative to the base member 70. Here, the linkage 72 includes two links that are pivotally connected between the base member 70 and the chain guide 71 to form a four-bar linkage.

The chain guide 71 is configured to move the chain C between the chainrings of the chainring assembly CR in response to the operation of the first shift operating device 14 of the bicycle electrical shifting apparatus 12. More specifically, the first bicycle electric transmission device 18 further includes an electric motor or actuator 73 that is mechanically connected to the linkage 72. Operation of the actuator 73 moves the linkage 72, which in turn moves the chain guide 71 relative to the base member 70. The actuator 73 is operated based on wireless control signals from the first shift operating device 14.

In order to receive and process the wireless control signals from the first shift operating device 14, the first bicycle electric transmission device 18 further comprises a second wireless communication unit 74 (wireless receiver) and a second controller 76. The second wireless communication unit 74 receives the control signals from the first wireless communication unit 46, and can recognize the wireless control signals based on the particular frequency of the control signal and/or an identifier included in the control signal. The second wireless communication unit 74 can be a two-way wireless communication unit if needed and/or desired. The second wireless communication unit 74 is configured to wirelessly receive the control signals O1 and O2 from the first wireless communication unit 46. The second controller 76 is operatively connected to the second wireless communication unit 74. Thus, the second controller 76 is programmed to receive the first and second wireless con signals O1 and O2 corresponding to the first and second signals and outputted from the first controller 44. Also the second controller 76 is programmed to control the transmission (i.e., the first bicycle electric transmission device 18) of the bicycle 1 to start the shifting operation in response to receiving the first wireless control signal O1 corresponding to the first signal and to stop the shifting operation in response to receiving the second wireless control signal O2 corresponding the second signal.

As seen in FIG. 8, the second controller 76 is programmed to control a shifting operation of the transmission (i.e., the first bicycle electric transmission device 18) of the bicycle 1 based on the length of time that either the first shift operating member 26 or the second shift operating member 28 is held in the operated position. For example, the second controller 76 is further programmed to control the transmission (i.e., the first bicycle electric transmission device 18) of the bicycle 1 to shift one speed stage of the transmission (i.e., the first bicycle electric transmission device 18) upon determining a first predetermined time period T1 has occurred after receiving the first wireless control signal O1 corresponding to the first signal of the first controller 44, but prior to the receiving the second wireless control signal O2 corresponding to the second signal of the first controller 44. The second controller 76 is further programmed to control the transmission to further shift one speed stage of the transmission upon determining a second predetermined time period T1 has occurred after the first predetermined time period T1 has occurred, but prior to the receiving the second wireless control signal O2 corresponding to the second signal of the first controller 44. The second controller 74 is configured to stop the shifting operation upon determining the transmission (i.e., the first bicycle electric transmission device 18) reaches one of a highest speed stage and a lowest speed stage. Thus, in FIG. 8, the second controller 76 will shift the first bicycle electric transmission device 18 two speed stages, if possible. In this programming of the second controller 76 shown in FIG. 8, the first predetermined time period T1 is the same as the second predetermined time period T1. Preferably, the second controller 76 is further programmed to vary the at least one of the first and second predetermined time periods T1 and T1 in response to an input. For example, as shown, in FIG. 14, the second controller 76 is programmed with a second predetermined time period T2. The first predetermined time period T1 is different from the second predetermined time period T2 in the shift timing of FIG. 14.

The adjustment of the second predetermined time period can be done my using the first and second shift operating members 26 and 28. For example, if the first and second shift operating members 26 and 28 are operated simultaneously, the second controller 74 will start a setting mode. Then, subsequent operation of the first shift operating member 26 wilt increase the length of the second predetermined time period, while subsequent operation of the second shift operating member 28 wilt decrease the length of the second predetermined time period. Also while in the setting mode, the first and second shift operating members 26 and 28 can be operated simultaneously to toggle between the various prestored shift timings such as those shown in FIGS. 8, 10, 12 and 14.

The second controller 76 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The second controller 76 is programmed to process the wireless control signals received by the wireless control signals from the second wireless communication unit 74, and the control the operation of the actuator 73 using the actuator driver 78 and the position sensor 79. As explained below, the second controller 76 is also programmed to control the operation of the second wireless communication unit 74 in such a manner to reduce the power consumption of the on-board power source 77.

As seen in FIG. 6, the second bicycle electric transmission device 20 is a rear bicycle derailleur that has a base member 80, a chain guide 81 and a linkage 82. The base member 80 is configured to be attached to the bicycle 1. In particular, the base member 80 is attached to the bicycle frame P adjacent to the cassette CS by a bolt 132. The chain guide 81 is movably supported relative to the base member 80. Specifically, in the illustrated embodiment, the linkage 82 movably supports the chain guide 81 relative to the base member 80. Here, the linkage 82 includes two links that are pivotally connected between the base member 80 and a movably member of the chain guide 81 to form a four-bar linkage.

The chain guide 81 is configured to move the chain C between the sprockets of the cassette CS in response to the operation of the second shift operating device 16 of the bicycle electrical shifting apparatus 12. More specifically, the second bicycle electric transmission device 20 further includes an electric motor or actuator 83 that is mechanically connected to the linkage 82. Operation of the actuator 83 moves the linkage 82, which in turn moves the chain guide 81 relative to the base member 80. The actuator 83 is operated based on wireless control signals from the second shift operating device 16.

In order to receive and process the wireless control signals from the second shift operating device 16, the second bicycle electric transmission device 20 further comprises a second wireless communication unit 84 (wireless receiver and a second controller 86. The second wireless communication unit 84 receives the control signals from the first wireless communication unit 56, and can recognize the wireless control signals based on the particular frequency of the control signal and/or an identifier included in the control signal. The second wireless communication unit 84 can be a two-way wireless communication unit if needed and/or desired. The second wireless communication unit 84 is configured to wirelessly receive the control signals O1 and O2 from the first wireless communication unit 56. The second controller 86 is operatively connected to the second wireless communication unit 84. Thus, the second controller 86 is programmed to receive the first and second wireless control signals O1 and O2 corresponding to the first and second signals and outputted from the first controller 54. Also the second controller 86 is programmed to control the transmission (i.e., the second bicycle electric transmission device 20) of the bicycle 1 to start the shifting operation in response to receiving the first wireless control signal O1 corresponding to the first signal and to stop the shifting operation in response to receiving the second wireless control signal O2 corresponding the second signal.

As seen in FIG. 8, the second controller 86 is programmed to control a shifting operation of the transmission (i.e., the second bicycle electric transmission device 20) of the bicycle 1 based on the length of time that either the first shift operating member 36 or the second shift operating member 38 is held in the operated position. For example, the second controller 76 is further programmed to control the transmission (i.e., the second bicycle electric transmission device 20) of the bicycle 1 to shift one speed stage of the transmission (i.e., the second bicycle electric transmission device 20) upon determining a first predetermined time period T1 has occurred after receiving the first wireless control signal O1 corresponding to the first signal of the first controller 54, but prior to the receiving the second wireless control signal O2 corresponding to the second signal of first controller 54. The second controller 86 is further programmed to control the transmission to further shift one speed stage of the transmission upon determining a second predetermined time period T1 has occurred after the first predetermined time period T1 has occurred, but prior to the receiving the second wireless control signal O2 corresponding to the second signal of the first controller 54. The second controller 84 is configured to stop the shifting operation upon determining the transmission (i.e., the second bicycle electric transmission device 20) reaches one of a highest speed stage and a lowest speed stage. Thus, in FIG. 8, the second controller 86 will shift the second bicycle electric transmission device 20 two speed stages, if possible. In this programming of the second controller 86 shown in FIG. 8, the first predetermined time period T1 is the same as the second predetermined time period T1. Preferably, the second controller 86 is further programmed to vary the at least one of the first and second predetermined time periods T1 and T1 in response to an input. For example, as shown, in FIG. 14, the second controller 86 is programmed with a second predetermined time period T2. The first predetermined time period T1 is different from the second predetermined time period T2 in the shift timing of FIG. 14.

The adjustment of the second predetermined time period can be done my using the first and second shift operating members 36 and 38. For example, if the first and second shift operating members 36 and 38 are operated simultaneously, the second controller 74 will start a setting mode. Then, subsequent operation of the first shift operating member 36 will increase the length of the second predetermined time period, while subsequent operation of the second shift operating member 38 will decrease the length of the second predetermined time period. Also while in the setting mode, the first and second shift operating members 36 and 38 can be operated simultaneously to toggle between the various prestored shift timings such as those shown in FIGS. 8, 10, 12 and 14.

The second controller 86 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The second controller 86 is programmed to process the wireless control signals received by the wireless control signals from the second wireless communication unit 84, and the control the operation of the actuator 83 using the actuator driver 88 and the position sensor 89. As explained below, the second controller 86 is also programmed to control the operation of the second wireless communication unit 84 in such a manner to reduce the power consumption of the on-board power source 88.

Figure 9:
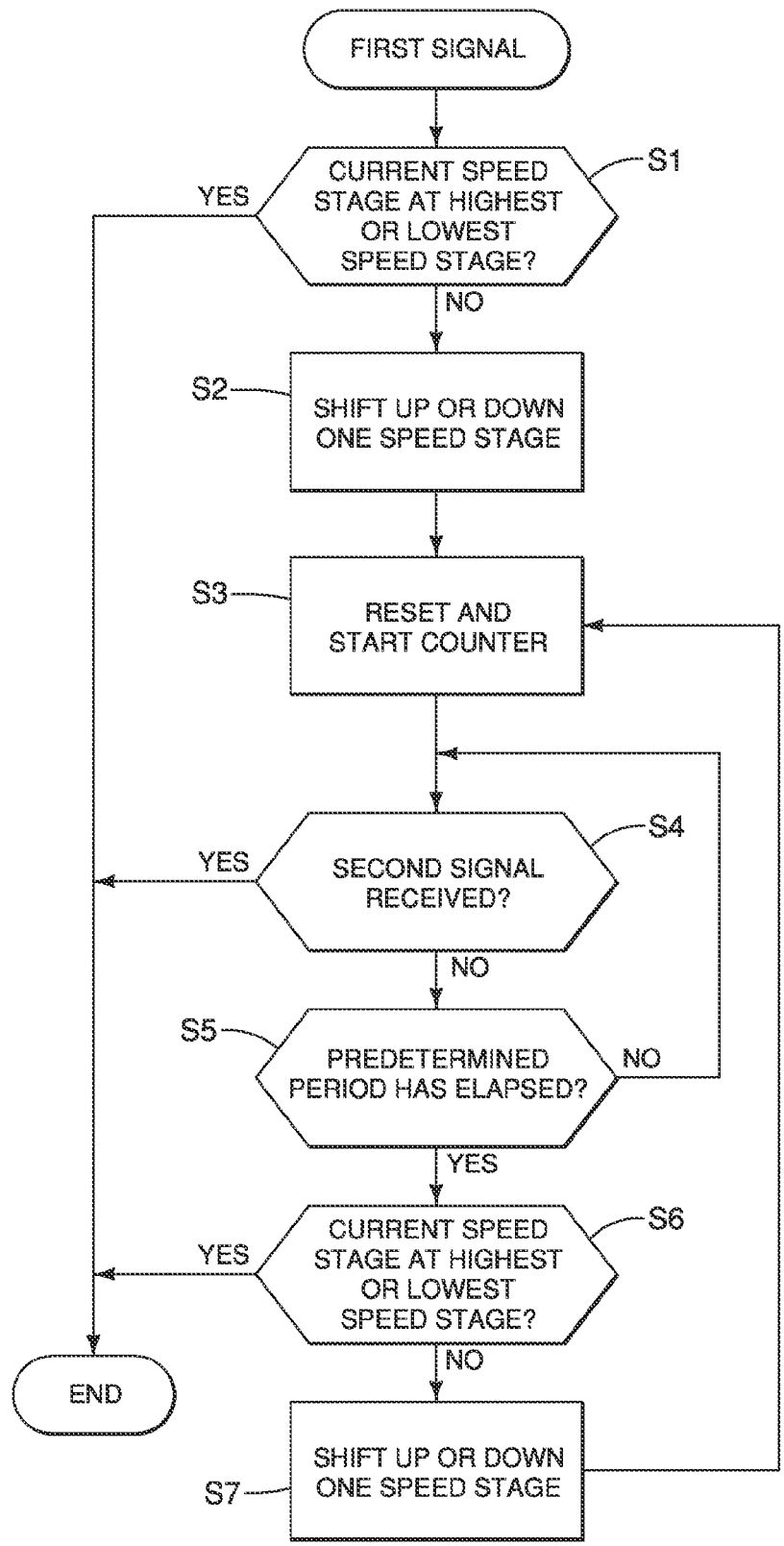
FIG. 9 is a flow chart illustrating a control process executed by the second controller using the shift timing of FIG. 8 in response to operation of the operating member.

Referring now to FIG. 9, a control process is illustrated that is executed by the second controllers 76 and 86 to operate the first and second bicycle electric transmission devices 18 and 20 based on the shift timing illustrated in FIG. 8. The control process of FIG. 9 is used by the second controller 76 for both upshifting and downshifting the first bicycle electric transmission device 18. Thus, when the first wireless control signal O1 corresponding to the first signal is received by the second wireless communication unit 74, the second controller 76 first determines if the first wireless control signal O1 is an upshifting signal or downshifting signal. Similarly, the control process of FIG. 9 is used by the second controller 86 for both upshifting and downshifting the second bicycle electric transmission device 20. Thus, when the first wireless control signal O1 corresponding to the first signal is received by the second wireless communication unit 84, the second controller 86 first determines if the first wireless control signal O1 is an upshifting signal or downshifting signal.

In step S1, after the second controller 76 or 86 receives the first wireless control signal O1 corresponding to the first signal, the second controller 76 or 86 determines if the current speed stage of the first bicycle electric transmission device 18 or the second bicycle electric transmission device 20 is currently at the highest speed stage for upshifting or the lowest speed stage for downshifting. If the second controller 76 or 86 determines the current speed stage of the first bicycle electric transmission device 18 or the second bicycle electric transmission device 20 is currently at the highest speed stage for upshifting or the lowest speed stage for downshifting, then the process ends and no shifting occurs. If the second controller 76 or 86 determines the current speed stage of the first bicycle electric transmission device 18 or the second bicycle electric transmission device 20 is not currently at the highest speed stage for upshifting or the lowest speed stage for downshifting, then the process proceeds to step S2.

In step S2, the second controller 76 or 86 upshifts or downshifts the first bicycle electric transmission device 18 or the second bicycle electric transmission device 20 based on whether the first wireless control signal O1 corresponding to the first signal was determined to be an upshift signal or a downshift signal, then the process proceeds to step S3.

In step S3, the second controller 76 or 86 resets a counter and then starts the counter. The counter can either count up or count down as needed and/or desired. Then process proceeds to step S3.

In step S4, the second controller 76 or 86 determines if the second signal has been received. If the second signal has been received, then the process ends. On the other hand, if the second signal has not been received, then process proceeds to step S5.

In step S5, the second controller 76 or 86 determines if a first predetermined time period T1 has elapsed. If the first predetermined time period T1 has not elapsed, then the process continues to repeat steps S4 and S5 until the first predetermined time period T1 has elapsed. If the second controller 76 or 86 determines the first predetermined time period T1 has elapsed, then process proceeds to step S6.

In step S6, the second controller 76 or 86 determines if the current speed stage of the first bicycle electric transmission device 18 or the second bicycle electric transmission device 20 is currently at the highest speed stage for upshifting or the lowest speed stage for downshifting. If the second controller 76 or 86 determines the current speed stage of the first bicycle electric transmission device 18 or the second bicycle electric transmission device 20 is currently at the highest speed stage for upshifting or the lowest speed stage for downshifting, then the process ends and no shifting occurs. If the second controller 76 or 86 determines the current speed stage of the first bicycle electric transmission device 18 or the second bicycle electric transmission device 20 is not currently at the highest speed stage for upshifting or the lowest speed stage for downshifting, then the process proceeds to step S7.

In step S7, the second controller 76 or 86 further upshifts or downshifts the first bicycle electric transmission device 18 or the second bicycle electric transmission device 20 based on whether the first wireless control signal O1 corresponding to the first signal was determined to be an upshift signal or a downshift signal. Then, the process proceeds back to step S3 where the second controller 76 or 86 resets a counter and then starts the counter.

The second controller 76 or 86 continues to repeat steps S3 to S7 until the second wireless control signal O2 corresponding to the second signal is received or the highest or lowest speed stage is reached in the direction of the shifting. Once the second wireless control signal O2 is received or the highest or lowest speed stage is reached in the direction of the shifting, the process ends. In this way, multiple shifts can be made based on the length of time that the shift operating member 26, 28, 36 or 38 is held the operated position.

Figure 10:
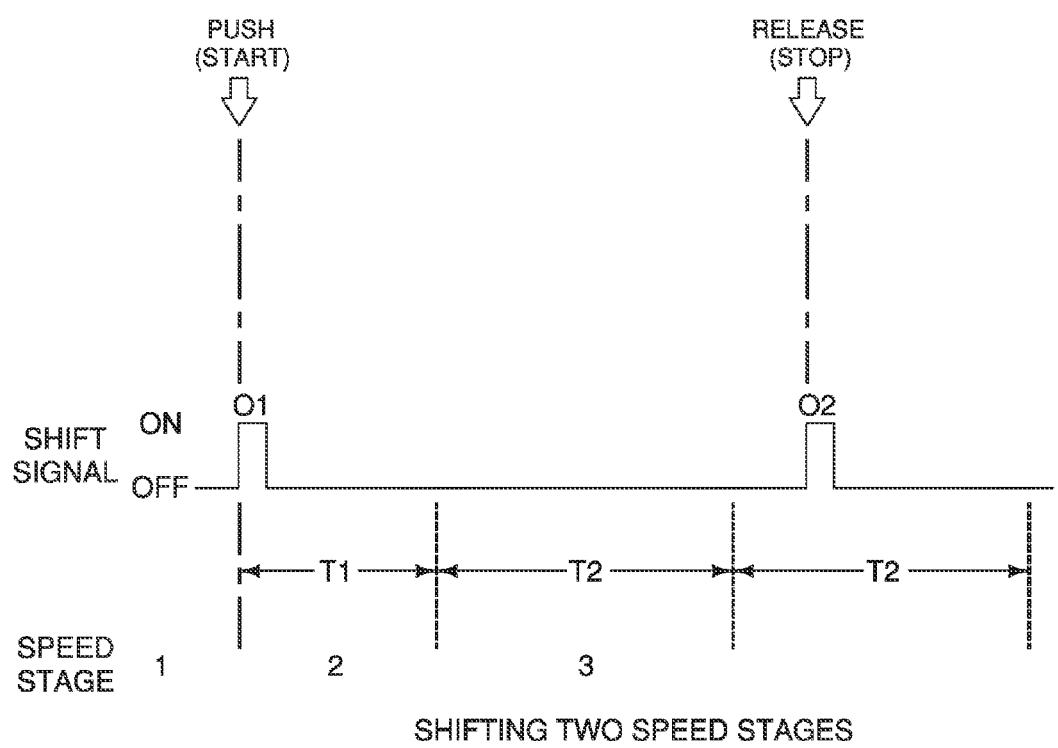
FIG. 10 is an alternative shift timing diagram illustrating a shift signal outputted to shift the transmission of the bicycle electrical shifting apparatus of FIG. 7.

Referring now to FIG. 10, a second shift timing is illustrated. Here, the second shift timing is identical to the first shift timing, except that the first predetermined time period T1 for performing the first shifting operation is different from the second predetermined time period T2 for performing the first shifting operation. With this second shift timing, the actuator 73 or 83 will be operated after a predetermined time period T1 or T2 elapses.

Figure 11:
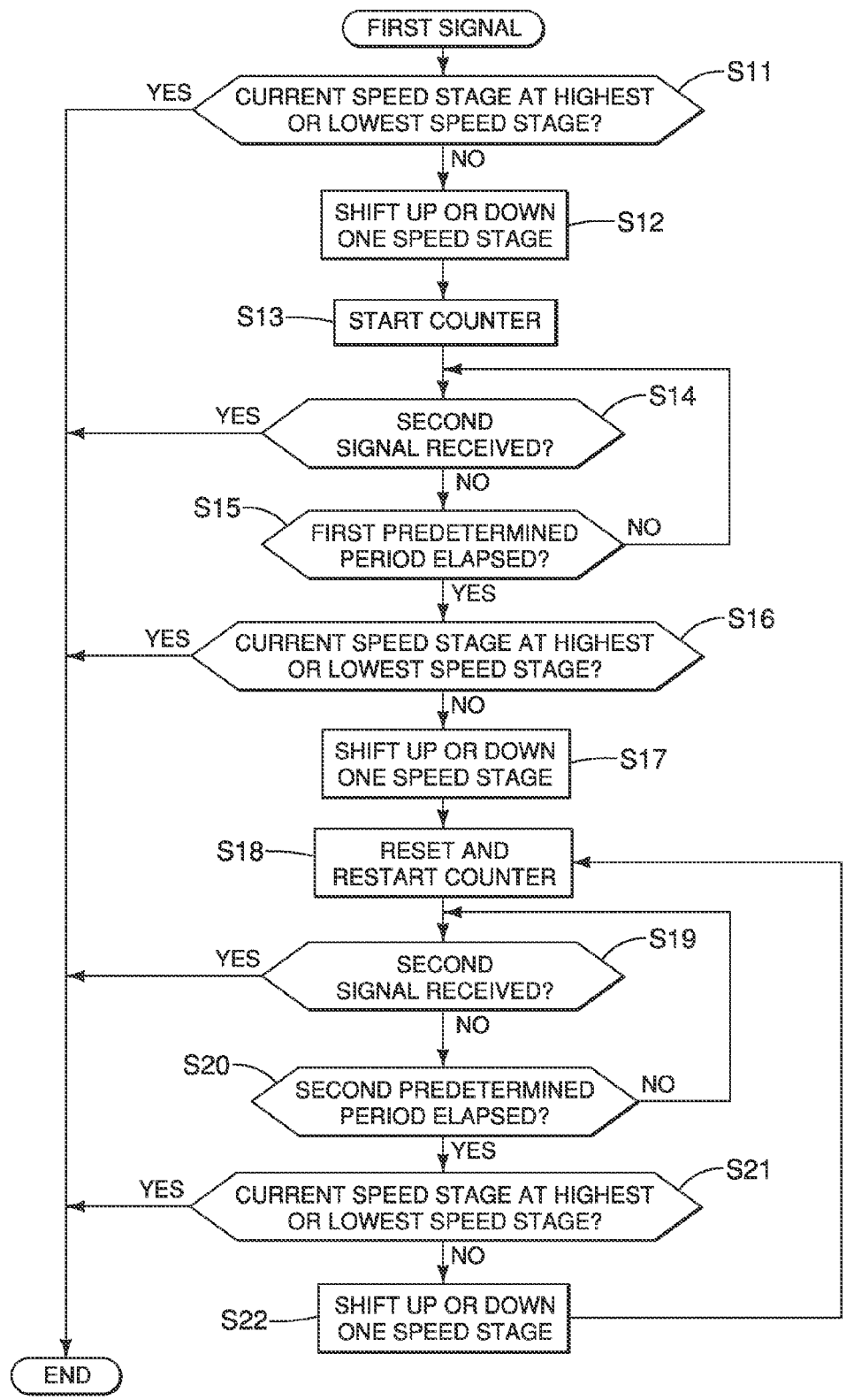
FIG. 11 is an alternative flow chart illustrating an alternative control process executed by the second controller using the shift timing of FIG. 14 in response to operation of the operating member.

Referring now to FIG. 11, a control process is illustrated that is executed by the second controllers 76 and 86 to operate the first and second bicycle electric transmission devices 18 and 20 based on the shift timing illustrated in FIG. 10. The control process of FIG. 10 is used by the second controller 76 for both upshifting and downshifting the first bicycle electric transmission device 18. Thus, when the first wireless control signal O1 corresponding to the first signal is received by the second wireless communication unit 74, the second controller 76 first determines if the first wireless control signal O1 is an upshifting signal or downshifting signal. Similarly, the control process of FIG. 10 is used by the second controller 86 for both upshifting and downshifting the second bicycle electric transmission device 20. Thus, when the first wireless control signal O1 corresponding to the first signal is received by the second wireless communication unit 84, the second controller 86 first determines if the first wireless control signal O1 is an upshifting signal or downshifting signal.

In step S11, after the second controller 76 or 86 receives the first wireless control signal O1 corresponding to the first signal, the second controller 76 or 86 determines if the current speed stage of the first bicycle electric transmission device 18 or the second bicycle electric transmission device 20 is currently at the highest speed stage for upshifting or the lowest speed stage for downshifting. If the second controller 76 or 86 determines the current speed stage of the first bicycle electric transmission device 18 or the second bicycle electric transmission device 20 is currently at the highest speed stage for upshifting or the lowest speed stage for downshifting, then the process ends and no shifting occurs. If the second controller 76 or 86 determines the current speed stage of the first bicycle electric transmission device 18 or the second bicycle electric transmission device 20 is not currently at the highest speed stage for upshifting or the lowest speed stage for downshifting, then the process proceeds to step S12.

In the step S12, the second controller 76 or 86 then will perform a single shifting operation. Whether the first bicycle electric transmission device 18 or the second bicycle electric transmission device 20 is upshifted or downshifted in step S12 depends whether the first wireless control signal O1 corresponding to the first signal was determined to be an upshift signal or a downshift signal at the start of the control process. Then, the process proceeds to step S13.

In step S13, the second controller 76 or 86 starts the counter. The counter can either count up or count down as needed and/or desired. Then process proceeds to step S14.

In step S14, the second controller 76 or 86 determines if the second signal has been received. If the second signal has been received, then the process ends without performing a shifting operation. On the other hand, if the second signal has not been received, then process proceeds to step S15.

In step S15, the second controller 76 or 86 determines if a first predetermined time period T1 has elapsed. If the first predetermined time period T1 has not elapsed, then the process continues to repeat steps S14 and S15 until the first predetermined time period T1 has elapsed. If the second controller 76 or 86 determines the first predetermined time period T1 has elapsed, then process proceeds to step S16.

In step S16, the second controller 76 or 86 determines if the current speed stage of the first bicycle electric transmission device 18 or the second bicycle electric transmission device 20 is currently at the highest speed stage for upshifting or the lowest speed stage for downshifting. If the second controller 76 or 86 determines the current speed stage of the first bicycle electric transmission device 18 or the second bicycle electric transmission device 20 is currently at the highest speed stage for upshifting or the lowest speed stage for downshifting, then the process ends and no shifting occurs. If the second controller 76 or 86 determines the current speed stage of the first bicycle electric transmission device 18 or the second bicycle electric transmission device 20 is not currently at the highest speed stage for upshifting or the lowest speed stage for downshifting, then the process proceeds to step S17.

In step S17, the second controller 76 or 86 then will perform a single shifting operation. Whether the first bicycle electric transmission device 18 or the second bicycle electric transmission device 20 is upshifted or downshifted in step S36 depends whether the first wireless control signal O1 corresponding to the first signal was determined to be an upshift signal or a downshift signal at the start of the control process. Then, the process proceeds to step S18.

In step S18, the second controller 76 or 86 resets a counter and then starts the counter. The counter can either count up or count down as needed and/or desired. Then process proceeds to step S19.

In step S19, the second controller 76 or 86 determines if the second signal has been received. If the second signal has been received, then the process ends. On the other hand, if the second signal has not been received, then process proceeds to step S20.

In step S20, the second controller 76 or 86 determines if a second predetermined time period T2 has elapsed. If the second predetermined time period T2 has not elapsed, then the process continues to repeat steps S19 and S20 until the second predetermined time period T2 has elapsed. If the second controller 76 or 86 determines the second predetermined time period T2 has elapsed, then process proceeds to step S21.

In step S21, the second controller 76 or 86 determines if the current speed stage of the first bicycle electric transmission device 18 or the second bicycle electric transmission device 20 is currently at the highest speed stage for upshifting or the lowest speed stage for downshifting. If the second controller 76 or 86 determines the current speed stage of the first bicycle electric transmission device 18 or the second bicycle electric transmission device 20 is currently at the highest speed stage for upshifting or the lowest speed stage for downshifting, then the process ends and no shifting occurs. If the second controller 76 or 86 determines the current speed stage of the first bicycle electric transmission device 18 or the second bicycle electric transmission device 20 is not currently at the highest speed stage for upshifting or the lowest speed stage for downshifting, then the process proceeds to step S22.

In step S22, the second controller 76 or 86 further upshifts or downshifts the first bicycle electric transmission device 18 or the second bicycle electric transmission device 20 based on whether the first wireless control signal O1 corresponding to the first signal was determined to be an upshift signal or a downshift signal. Then, the process proceeds back to step S18 where the second controller 76 or 86 resets a counter and then starts the counter.

The second controller 76 or 86 continues to repeat steps S18 to S2.2 until the second wireless control signal O2 corresponding to the second signal is received or the highest or lowest speed stage is reached in the direction of the shifting. Once the second wireless control signal O2 is received or the highest or lowest speed stage is reached in the direction of the shifting, the process ends. In this way, multiple shifts can be made based on the length of time that the shift operating member 26, 28, 36 or 38 is held in the operated position.

Figure 12:
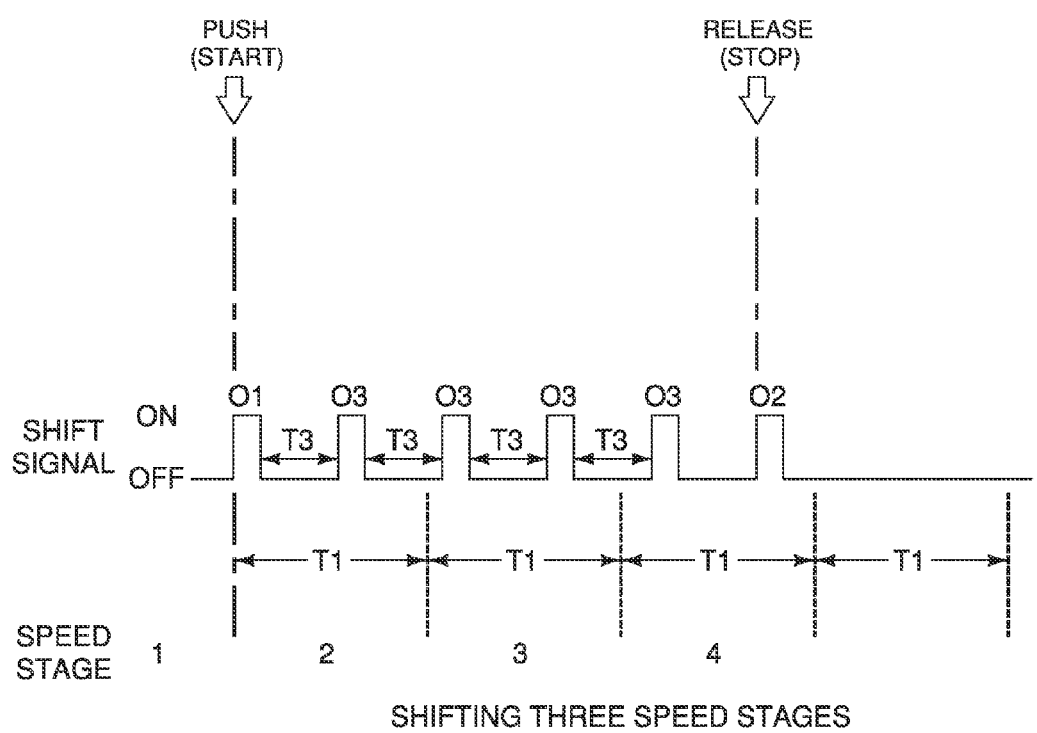
FIG. 12 is an alternative shift timing diagram illustrating a shift signal outputted to shift the transmission of the bicycle electrical shifting apparatus of FIG. 7.

Referring now to FIG. 12, a third shift timing is illustrated. Here, the third shift timing is identical to the first shift timing, except that each of the first wireless communication units 46 and 56 outputs an additional wireless control signal O3 in addition to the first and second wireless control signals O1 and O2 every time a third predetermined time period T3 has occurred. The additional wireless control signal O3 is generated in response to the first controllers 44 and 54, which are further programmed to output an additional signal every time a third predetermined period is occurred. The additional signals are between the first signal and the second signal. The additional signal is configured to have the second controller 76 and 86, respectively, continue the shifting operation. The second controllers 76 or 86 determines if the additional wireless control signal O3 has received within a predetermined time period equals to or larger than the third predetermined time period T3 in parallel with the control process illustrated in FIG. 9. If the second controllers 76 or 86 determines the additional wireless control signal O3 has not received within the predetermined time period, the second controllers 76 or 86 executes a force-quit of the control process except during the shifting operation, steps S2 or S7, if the second controllers 76 or 86 determines that the additional wireless control signal O3 has not been received within the predetermined time period when the control process is in steps S2 or S7, then the second controllers 76 or 86 end the control process after the steps S2 or S7 has completed.

The first wireless communication units 46 and 56 and the second wireless communication units 74 and 84 respectively communicate each other by using common wireless communication protocol, for example IEEE 802.15.4 communication protocol, but other suitable wireless communication protocol also can be used. It is possible to set the first wireless communication units 46 and 56 and the second wireless communication units 74 and 84 to one of a plurality of different selectable transmitter and receiver frequency channels to avoid crosstalk with other systems in the vicinity. The first wireless communication units 46 and 56 are paired with the second wireless communication units 74 and 84 in a conventional manner to enable wireless communication therebetween. Alternatively, the wireless receiver 74 could be configured to wirelessly receive the control signals from the wireless transmitter 56, and the wireless receiver 84 could be configured to wirelessly receive the control signals from the wireless transmitter 46.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," portion, "member" or "element" when used in the singular can have the dual meaning of a single part or a plurality of parts unless otherwise stated.

As used herein, the terms "left" and "right" are used to indicate the "right" when referencing from the right side as viewed from the rear of the bicycle, and the "left" when referencing from the left side as viewed from the rear of the bicycle. Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electric shifting apparatus comprising:
a shift operating device including
an operating member, the operating member being movable between a rest position and an operated position; and
a first controller programmed to output a first signal that starts a shifting operation in response to a single manual operation of the operating member from the rest position to the operated position, and a second signal that ends the shifting operation in response to the operating member returning to the rest position at an end of the single manual operation.

2. The bicycle electric shifting apparatus according to claim 1, wherein
the first signal is independent from the second signal.

3. The bicycle electric shifting apparatus according to claim 1, wherein
the first signal is different from the second signal.

4. The bicycle electric shifting apparatus according to claim 3, wherein
the first signal is different from the second signal in a wave ape.

5. The bicycle electric shifting apparatus according to claim 3, wherein
the first signal is different from the second signal in a voltage.

6. The bicycle electric shifting apparatus according to claim 1, further comprising
a first wireless communication unit configured to wirelessly transmit a first control signal corresponding to the first signal outputted from the first controller, and to wirelessly transmit a second control signal corresponding to the second signal outputted from the first controller.

7. The bicycle electric shifting apparatus according to claim 1, further comprising
a transmission; and
a second controller programmed to receive a first control signal corresponding to the first signal outputted from the first controller and a second control signal corresponding to the second signal outputted from the first controller, the second controller being programmed to control the transmission to start the shifting operation in response to receiving the first control signal to stop the shifting operation in response to receiving the second control signal.

8. The bicycle electric shifting apparatus according to claim 7, wherein
the second controller is configured to stop the shifting operation upon determining the transmission reaches one of a highest speed stage and a lowest speed stage.

9. The bicycle electric shifting apparatus according to claim 7, wherein
the first controller is further programmed to output at least one additional signal between the first signal and the second signal and the additional signal is configured to have the second controller continue the shifting operation.

10. The bicycle electric shifting apparatus according to claim 9, wherein
the first controller further programmed to output the at least one additional signal every time a third predetermined time period is occurred.

11. A bicycle electric shifting apparatus comprising:
a shift operating device including
an operating member; and
a first controller programmed to output a first signal that starts a shifting operation in response to a single manual operation of the operating member and a second signal that ends the shifting operation in response to an end of the single manual operation of the operating member;
a transmission;
a second controller programmed to receive a first control signal corresponding to the first signal outputted from the first controller and a second control signal corresponding to the second signal outputted from the first controller, the second controller being programmed to control the transmission to start the shifting operation in response to receiving the first control signal to stop the shifting operation in response to receiving the second control signal;
a first wireless communication unit configured to wirelessly transmit first and second control signals; and
a second wireless communication unit configured to wirelessly receive the first and second control signals outputted from the first wireless communication unit.

12. A bicycle electric shifting apparatus comprising:
a shift operating device including
an operating member; and
a first controller programmed to output a first signal that starts a shifting operation in response to a single manual operation of the operating member and a second signal that ends the shifting operation in response to an end of the single manual operation of the operating member;
a transmission, and
a second controller programmed to receive a first control signal corresponding to the first signal outputted from the first controller and a second control signal corresponding to the second signal outputted from the first controller, the second controller being programmed to control the transmission to start the shifting operation in response to receiving the first control signal to stop the shifting operation in response to receiving the second control signal,
the second controller being further programmed to control the transmission to shift one speed stage of the transmission upon determining a first predetermined time period has occurred after receiving the first control signal corresponding to the first signal, the second controller being further programmed to control the transmission to further shift one speed stage of the transmission upon determining a second predetermined time period has occurred after the first predetermined time period has occurred.

13. The bicycle electric shifting apparatus according to claim 12, wherein the first predetermined time period is the same as the second predetermined time period.

14. The bicycle electric shilling apparatus according to claim 12, wherein the first predetermined time period is different from the second predetermined time period.

15. The bicycle electric shifting apparatus according to claim 12, wherein the second controller is further programmed to vary the at least one of the first and second predetermined time periods in response to an input.

\* \* \* \* \*